United States Patent
Bartel et al.

(10) Patent No.: US 7,254,930 B2
(45) Date of Patent: *Aug. 14, 2007

(54) STATIONARY TUCKER BAR MECHANISM

(75) Inventors: Lawrence Joseph Bartel, Pilot Point, TX (US); Anthony Robert Knoerzer, Parker, TX (US); Garrett William Kohl, Allen, TX (US); Steven Kenneth Tucker, Hurst, TX (US)

(73) Assignee: Frito-Lay North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/282,176

(22) Filed: Nov. 18, 2005

(65) Prior Publication Data

US 2006/0064947 A1    Mar. 30, 2006

Related U.S. Application Data

(60) Continuation-in-part of application No. 10/778,839, filed on Feb. 13, 2004, which is a division of application No. 10/100,370, filed on Mar. 18, 2002, now Pat. No. 6,722,106.

(51) Int. Cl.
*B65B 9/20* (2006.01)

(52) U.S. Cl. .................... 53/450; 53/451; 53/370.6; 493/418

(58) Field of Classification Search ........... 53/370.6
See application file for complete search history.

(56) References Cited

U.S. PATENT DOCUMENTS 2,265,075 A    12/1941  Knuetter
2,718,105 A     9/1955  Ferguson
2,978,853 A     4/1961  Price
3,337,117 A     8/1967  Lehmacher et al.
3,382,644 A     5/1968  Vogt
3,537,636 A    11/1970  Rochette
3,543,467 A    12/1970  Leasure
3,566,756 A *   3/1971  Schmid et al. ............... 493/439
3,741,778 A     6/1973  Rowe
3,785,112 A     1/1974  Leasure et al.
3,785,636 A     1/1974  Bitting et al.
3,918,698 A *  11/1975  Coast .......................... 493/442
3,935,993 A     2/1976  Doyen et al.

(Continued)

FOREIGN PATENT DOCUMENTS

GB              2101909          5/2001

(Continued)

*Primary Examiner*—John Sipos
(74) *Attorney, Agent, or Firm*—Carstens & Cahoon, LLP; Colin P. Cahoon

(57) ABSTRACT

A stationary tucker bar mechanism attached to a vertical form, fill, and seal packaging machine used to construct a vertical stand-up pouch and a gusseted flat bottom bag. The invention involves producing a vertical stand-up pouch or flat bottom bag from a single sheet of packaging film by forming one or two vertical creases along opposing sides of the packaging film tube prior to forming a transverse seal on the tube. The vertical crease is formed using the stationary tucker bar gusseting mechanism positioned outside the packaging film tube and positioned between two forming plates located inside the packaging film tube. While the tucker bar gusseting mechanism is stationary during operation, it is fully adjustable along multiple axes of orientation.

21 Claims, 11 Drawing Sheets

U.S. PATENT DOCUMENTS

| | | | |
|---|---|---|---|
| 3,955,338 A * | 5/1976 | Winzeler et al. | 53/370.6 |
| 3,980,225 A | 9/1976 | Kan | |
| 4,194,438 A | 3/1980 | Schmachtel | |
| 4,597,103 A | 6/1986 | Hoover | |
| 4,604,854 A | 8/1986 | Andreas | |
| 4,624,095 A * | 11/1986 | Gietman, Jr. | 53/117 |
| 4,697,403 A | 10/1987 | Simpson et al. | |
| 4,894,975 A | 1/1990 | Ausnit | |
| 4,913,561 A | 4/1990 | Beer | |
| 4,925,438 A | 5/1990 | Wagner | |
| 4,986,054 A | 1/1991 | McMahon | |
| 5,030,190 A | 7/1991 | Woods et al. | |
| 5,046,300 A | 9/1991 | Custer et al. | |
| 5,127,208 A | 7/1992 | Custer et al. | |
| 5,170,608 A | 12/1992 | Petry et al. | |
| 5,242,516 A | 9/1993 | Custer et al. | |
| 5,246,416 A | 9/1993 | Demura | |
| 5,255,497 A | 10/1993 | Zoromski et al. | |
| 5,322,579 A | 6/1994 | Van Erden | |
| 5,398,486 A | 3/1995 | Kauss et al. | |
| 5,400,565 A | 3/1995 | Terminella et al. | |
| RE34,905 E | 4/1995 | Ausnit | |
| 5,412,924 A | 5/1995 | Ausnit | |
| 5,425,216 A | 6/1995 | Ausnit | |
| 5,505,037 A | 4/1996 | Terminella et al. | |
| 5,551,208 A | 9/1996 | Van Erden | |
| 5,561,966 A | 10/1996 | English | |
| 5,564,259 A | 10/1996 | Stolmeier | |
| 5,590,783 A | 1/1997 | Capy et al. | |
| 5,746,043 A | 5/1998 | Terminella et al. | |
| 5,768,852 A | 6/1998 | Terminella et al. | |
| 5,862,652 A | 1/1999 | Schoeler | |
| 5,916,685 A | 6/1999 | Frisk | |
| 5,930,983 A | 8/1999 | Terminella et al. | |
| 5,957,823 A * | 9/1999 | Fan | 493/248 |
| 5,971,613 A | 10/1999 | Bell | |
| 6,029,428 A | 2/2000 | Terminella et al. | |
| 6,047,521 A | 4/2000 | Terminella et al. | |
| 6,145,282 A | 11/2000 | Tsuruta | |
| 6,398,412 B2 | 6/2002 | Wedi et al. | |
| 6,615,567 B2 | 9/2003 | Kuhn et al. | |
| 6,655,110 B2 | 12/2003 | Taylor | |

FOREIGN PATENT DOCUMENTS

| | | |
|---|---|---|
| JP | 2191159 | 7/1990 |
| JP | 6-305057 | 11/1994 |
| JP | 2000-190908 | 7/2000 |
| JP | 2001-206307 | 7/2001 |

* cited by examiner

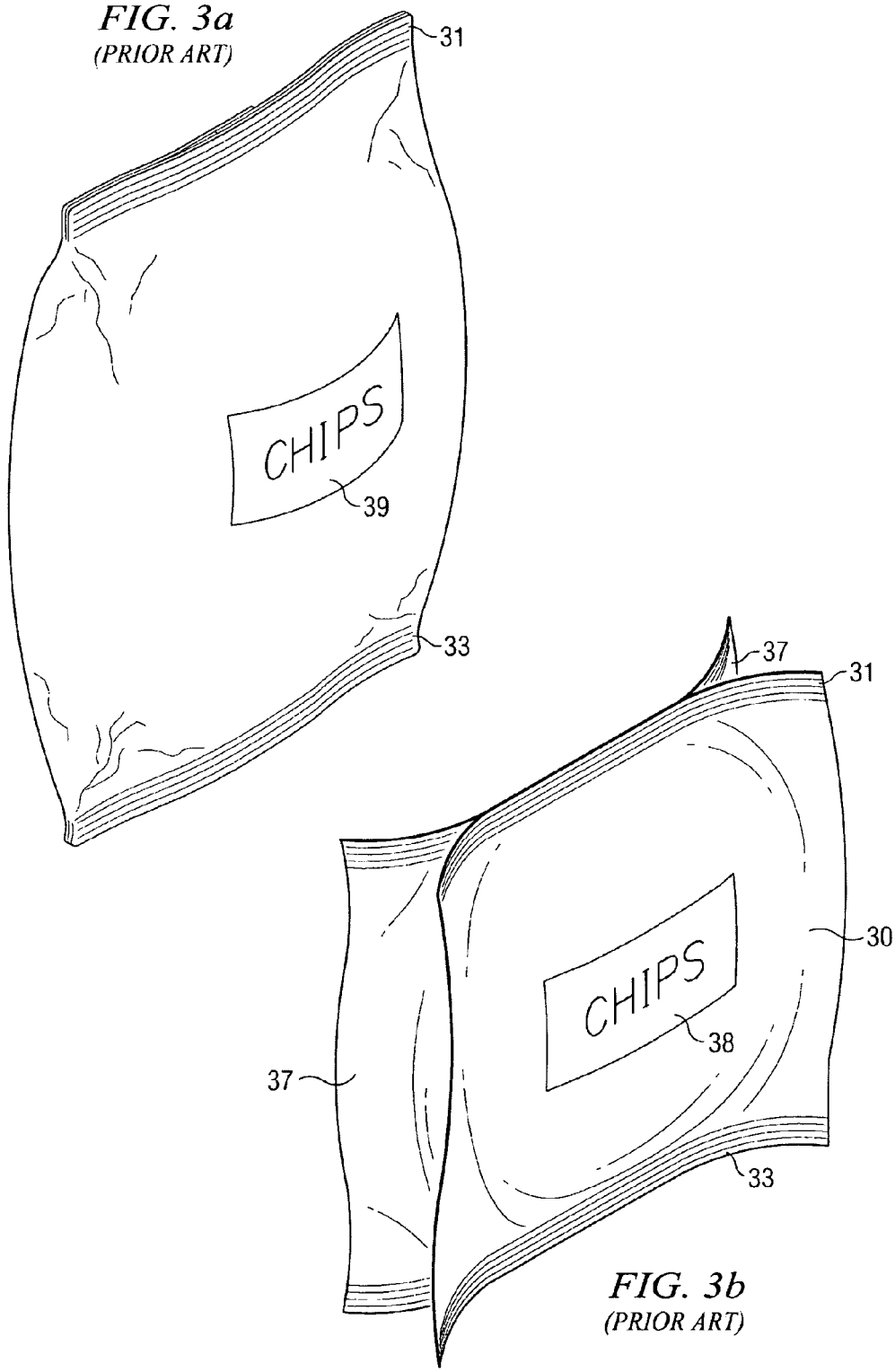

STATIONARY TUCKER BAR MECHANISM

CROSS-REFERENCE TO RELATED APPLICATIONS

This application is a continuation-in-part of co-pending U.S. patent application Ser. No. 10/778,839, filed on Feb. 13, 2004, which, in turn, is a divisional application of U.S. patent application Ser. No. 10/100,370, filed on Mar. 18, 2002 (now U.S. Pat. No. 6,722,106).

BACKGROUND OF THE INVENTION

1. Technical Field

The present invention relates to a stationary tucker bar mechanism attached to a vertical form, fill, and seal packaging machine and method for using the same to construct a vertical stand-up pouch and a gusseted flat bottom bag, that provides for a single piece construction of a vertical stand-up bag suitable for retail snack food distribution. The invention allows for use of existing film converter and packaging technology to produce a stand-up package with minimal increased costs and minimal modifications.

2. Description of the Related Art

Vertical form, fill, and seal packaging machines are commonly used in the snack food industry for forming, filling, and sealing bags of chips and other like products. Such packaging machines take a packaging film from a sheet roll and forms the film into a vertical tube around a product delivery cylinder. The vertical tube is vertically sealed along its length to form a back seal. The machine applies a pair of heat-sealing jaws or facings against the tube to form a horizontal transverse seal. This transverse seal acts as the top seal on the bag below and the bottom seal on the package being filled and formed above. The product to be packaged, such as potato chips, is dropped through the product delivery cylinder and formed tube and is held within the tube above the bottom transverse seal. After the package has been filled, the film tube is pushed downward to draw out another package length. A transverse seal is formed above the product, thus sealing it within the film tube and forming a package of product. The package below said transverse seal is separated from the rest of the film tube by cutting horizontally across the sealed area.

The packaging film used in such process is typically a composite polymer material produced by a film converter. For example, one prior art composite film used for packaging potato chips and like products is illustrated in FIG. 1, which is a schematic of a cross-section of the film illustrating each individual substantive layer. FIG. 1 shows an inside, or product side, layer 16 which typically comprises metalized oriented polypropylene ("OPP") or metalized polyethylene terephtalate ("PET"). This is followed by a laminate layer 14, typically a polyethylene extrusion, and an ink or graphics layer 12. The ink layer 12 is typically used for the presentation of graphics that can be viewed through a transparent outside layer 10, which layer 10 is typically OPP or PET.

The prior art film composition shown in FIG. 1 is ideally suited for use on vertical form, fill, and seal machines for the packaging of food products. The metalized inside layer 16, which is usually metalized with a thin layer of aluminum, provides excellent barrier properties. The use of OPP or PET for the outside layer 10 and the inside layer 16 further makes it possible to heat seal any surface of the film to any other surface in forming either the transverse seals or back seal of a package. Alternatively, a material can be used on the outside layer 12 that will not seal on itself, such as a paper layer or a non-sealing polymer layer, so that only the inside layer 16 is used as a sealing surface.

Typical back seals formed using the film composition shown in FIG. 1 are illustrated in FIGS. 2a and 2b. FIG. 2a is a schematic of a "lap seal" embodiment of a back seal being formed on a tube of film, which can be used when the outside and inside layers are sealable together. FIG. 2b illustrates a "fin seal" embodiment of a back seal being formed on a tube of film, which can be used when the outside layer is not suitable as a sealing surface.

With reference to FIG. 2a, a portion of the inside metalized layer 26 is mated with a portion of the outside layer 20 in the area indicated by the arrows to form a lap seal. The seal in this area is accomplished by applying heat and pressure to the film in such area. The lap seal design shown in FIG. 2a insures that the product to be placed inside the formed package will be protected from the ink layer by the metalized inside layer 26.

The fin seal variation shown in FIG. 2b also provides that the product to be placed in the formed package will be protected from the ink layer by the metalized inside layer 26. Again, the outside layer 20 does not contact any product. In the embodiment shown in FIG. 2b, however, the inside layer 26 is folded over and then sealed on itself in the area indicated by the arrows. Again, this seal is accomplished by the application of heat and pressure to the film in the area illustrated.

Regardless of whether a lap seal or fin seal is used for constructing a standard package using a vertical form, fill, and seal packaging machine, the end result is a package as shown in FIG. 3a with horizontally oriented top and bottom transverse seals 31, 33. Such package is referred to in the art as a "vertical flex bag" or "pillow pouch," and is commonly used for packaging snack foods such as potato chips, tortilla chips, and other various sheeted and extruded products. The back seal discussed with reference to FIGS. 2a and 2b runs vertically along the bag and is typically centered on the back of the package shown in FIG. 3a, thus not visible in FIG. 3a. Because of the narrow, single edge base on the package shown in FIG. 3a formed by the bottom transverse seal 33, such prior art packages are not particularly stable when standing on one end. This shortcoming has been addressed in the packaging industry by the development of a horizontal stand-up pouch such as the embodiment illustrated in FIGS. 4a, 4b, and 4c. As can be seen by reference to said figures, such horizontal stand-up pouch has a relatively broad and flat base 47 having two contact edges. This allows for the pouch to rest on this base 47 in a vertical presentation. Manufacture of such horizontal stand-up pouches, however, does not involve the use of standard vertical form, fill, and seal machines but, rather, involves an expensive and relatively slow 3-piece construction using a pouch form, fill, and seal machine.

Referring to FIGS. 4b and 4c, the horizontal stand-up pouch of the prior art is constructed of three separate pieces of film that are mated together, namely, a front sheet 41, a rear sheet 43, and a base sheet 45. The front sheet 41 and rear sheet 43 are sealed against each other around their edges, typically by heat sealing. The base sheet 45 is, however, first secured along its outer edges to the outer edges of the bottom of the front sheet 41 and rear sheet 43, as is best illustrated in FIG. 4c. Likewise, the mating of the base sheet 45 to the front sheet 41 and the rear sheet 43 is also accomplished typically by a heat seal. The requirement that such horizontal stand-up pouch be constructed of three pieces results in a package that is significantly more expensive to construct than a standard form, fill, and seal vertical flex bag.

Further disadvantages of using horizontal stand-up pouches include the initial capital expense of the horizontal stand-up pouch machines, the additional gas flush volume required during packaging as compared to a vertical flex bag, increased down time to change the bag size, slower bag forming speed, and a decreased bag size range. For example, a Polaris model vertical form, fill, and seal machine manufactured by Klick Lock Woodman of Georgia, USA, with a volume capacity of 60-100 bags per minute costs in the range of $75,000.00 per machine. A typical horizontal stand-up pouch manufacturing machine manufactured by Roberts Packaging of Battle Creek, Mich., with a bag capacity of 40-60 bags per minute typically costs $500,000.00. The film cost for a standard vertical form, fill, and seal package is approximately $0.04 per bag with a comparable horizontal stand-up pouch costing roughly twice as much. Horizontal stand-up pouches further require more than twice the oxygen or nitrogen gas flush. Changing the bag size on a horizontal stand-up pouch further takes in excess of two hours, typically, while a vertical form and fill machine bag size can be changed in a matter of minutes. Also, the typical bag size range on a horizontal stand-up pouch machine is from 4 oz. to 10 oz., while a vertical form and fill machine can typically make bags in the size range of 1 oz. to 24 oz.

One advantage of a horizontal stand-up pouch machine over a vertical form, fill, and seal and seal machine, however, is the relatively simple additional step of adding a zipper seal at the top of the bag for reclosing of the bag. Vertical form, fill, and seal machines typically require substantial modification and/or the use of zipper seals premounted on the film oriented horizontally to the seal facings used to seal the horizontal transverse seals.

An alternative approach taken in the prior art to producing a bag with more of a stand-up presentation is the construction of a flat bottom bag such as illustrated in FIG. 3b. Such bag is constructed in a method very similar to that described above with regard to prior art pillow pouches. However, in order to form the vertical gussets 37 on either side of the bag, the vertical form, fill, and seal machine must be substantially modified by the addition of two movable devices on opposite sides of the sealing carriage that move in and out to make contact with the packaging film tube in order to form the tuck that becomes the gussets 37 shown in FIG. 3b. Specifically, when a tube is pushed down to form the next bag, two triangular shaped devices are moved horizontally towards the packaging film tube until two vertical tucks are formed on the packaging film tube above the transverse seals by virtue of contact with these moving triangular shaped devices. While the two triangular shaped devices are thus in contact with the packaging tube, the bottom transverse seal 33 is formed. The package is constructed with an outer layer 30 that is non-sealable, such as paper. This causes the formation of a V-shaped gusset 37 along each vertical edge of the package when the transverse seals 31, 33 are formed. While the triangular shaped devices are still in contact with the tube of packaging material, the product is dropped through the forming tube into the tube of packaging film that is sealed at one end by virtue of the lower transverse seal 33. The triangular shaped devices are then removed from contact with the tube of packaging film and the film is pushed down for the formation of the next package. The process is repeated such that the lower transverse seal 33 of the package above and upper transverse seal 31 of the package below are then formed. This transverse seal is then cut, thereby releasing a formed and filled package from the machine having the distinctive vertical gussets 37 shown in FIG. 3b.

The prior art method described above forms a package with a relatively broad base due to the V-shaped vertical gussets 37. Consequently, it is commonly referred to in the art as a flat bottom bag. Such a flat bottom bag is advantageous over the previously described horizontal stand-up pouch in that it is formed on a vertical form, fill, and seal machine, albeit with major modifications. However, the prior art method of making a flat bottom bag has a number of significant drawbacks. For example, the capital expense for modifying the vertical form, fill, and seal machine to include the moving triangular-shaped devices is approximately $30,000.00 per machine. The changeover time to convert a vertical form, fill, and seal machine from a standard pillow pouch configuration to a stand-up bag configuration can be substantial, and generally in the neighborhood of one-quarter man hours. The addition of all of the moving parts required for the triangular-shaped device to move in and out of position during each package formation cycle also adds complexity to the vertical form, fill, and seal machine, inevitably resulting in maintenance issues. Importantly, the vertical form, fill, and seal machine modified to include the moving triangular-shaped devices is significantly slower than a vertical form, fill, and seal machine without such devices because of these moving components that form the vertical gussets. For example, in the formation of a six inch by nine inch bag, the maximum run speed for a modified vertical form, fill, and seal machine using the triangular-shaped moving devices is in the range of 15 to 20 bags per minute. A standard vertical form, fill, and seal machine without such modification can construct a similarly sized pillow pouch at the rate of approximately 40 bags per minute.

Consequently, a need exists for a method to form a stand-up pouch, similar in appearance and functionality to the prior art horizontal stand-up pouches and flat bottom bags, using vertical form, fill, and seal machine technology and a single sheet of packaging film. This method should allow for reduced film cost per bag as compared to horizontal stand-up pouches, ease in size change, little capital outlay, and the ability to easily add a zipper seal to the bags, all while maintaining bag forming speeds typical of vertical form, fill, and seal machine pillow pouch production. Such method should ideally produce a vertical stand-up pouch or a flat bottom bag constructed of materials commonly used to form standard vertical flex bags.

SUMMARY OF THE INVENTION

The proposed invention involves producing a vertical stand-up pouch or a gusseted flat bottom bag constructed of a single sheet of material using a slightly modified vertical form, fill, and seal machine. In one configuration, the vertical form, fill, and seal machine further includes a stationary but adjustable tucker mechanism mounted to a frame of the machine which, when positioned between two forming plates, engages the packaging film creating a vertical gusset or tuck along the length of the bag while it is being formed.

The labeling on the packaging film used in making a vertical stand-up pouch using the present invention may be oriented 90° off from the conventional orientation. Thus, the labeling graphics on the resulting package are oriented 90° from a standard presentation such that the gusset or tuck forms the bottom base of the bag. The transverse seals on the formed bag are therefore oriented vertically when the bag is placed on display. A zipper seal or reclose seal can be easily added to the construction of such a vertical stand-up bag since the zipper seal can accompany the single sheet of film in a continuous strip along one edge of the film.

In another configuration, the vertical form, fill, and seal machine further includes two stationary but adjustable tucker mechanism mounted to a frame of the machine and operable for positioning on opposing sides of the forming tube. Each tucker mechanism is positioned between a respective pair of forming plates, thereby creating a vertical crease or tuck on opposing sides along the length of the bag while it is being advanced down the forming tube of the machine.

The labeling of the packaging film may be oriented in line with the longitudinal translation of the film so as to be readable by an operator of the machine as the film travels down the forming tube. In this configuration, the transverse seals on the formed bag are oriented horizontally when the bag is placed on display. The formed bag provides a stable flat bottom due to the "V" shaped gussets formed on each vertical side of the bag.

Alternatively, the labeling on the packaging film used in the making of flat-bottomed bags using the present invention may be oriented 90° off from the conventional orientation, such that the labeling graphics appear sideways as viewed by the operator of the vertical form and fill machine as the film is advanced down the forming tube. In other words, the labeling graphics on the packaging film are oriented perpendicular to the direction of film travel. In this configuration, the transverse seals on the formed bag are vertically oriented when the bag is placed on display. Thus, the labeling graphics on the resulting package are oriented 90° from a standard presentation such that the "V" shaped gussets gusset or tuck form the bottom base and top of the bag.

The apparatus and methods disclosed, and the pouches and bags formed as a consequence, are a substantial improvement over prior art horizontal stand-up pouches and flat bottom bags. The methods works on existing vertical form, fill, and seal machines requiring very little modification. There are no moving parts and no jaw carriage modifications involved. The vertical form, fill, and seal machine can be easily converted back to a conventional pillow pouch configuration with a simple former change. The same metalized or clear laminations used as materials in pillow pouches can also be used with the invention therefore saving in per bag cost. The invention allows for the formation of bags that emulate a horizontal stand-up pouch using a completely different method that takes advantage of the economics of vertical form, fill, and seal machine technology.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 3a is a perspective view of a prior art vertical flex bag;

FIG. 3b is a perspective view of a prior art flat bottom bag;

Figure 1:
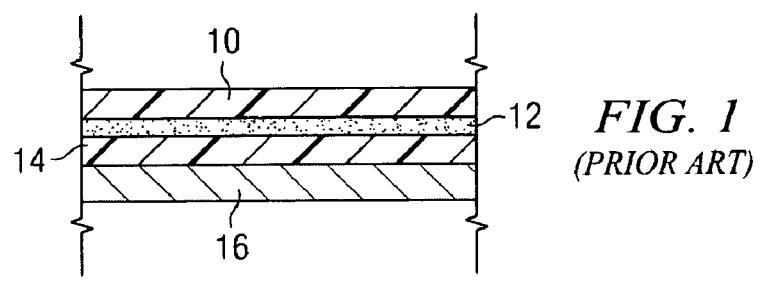
FIG. 1 is a schematic cross-section views of prior art packaging films.
Figure 2A:
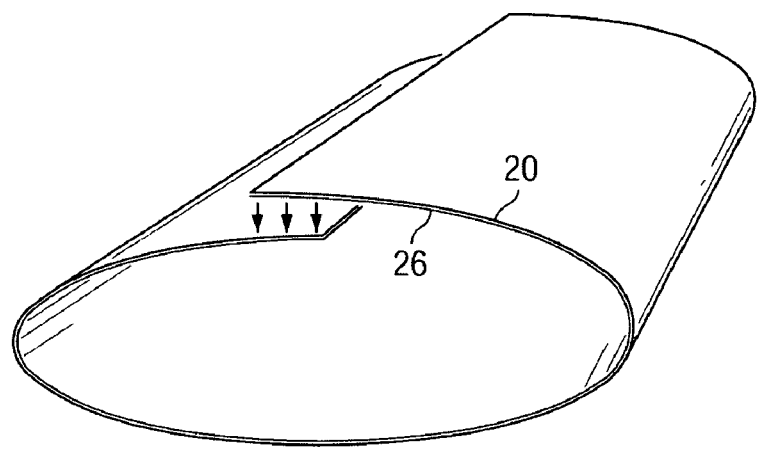
FIG. 2a is a schematic cross-section view of a tube of packaging film illustrating the formation of a prior art lap seal.
Figure 2B:
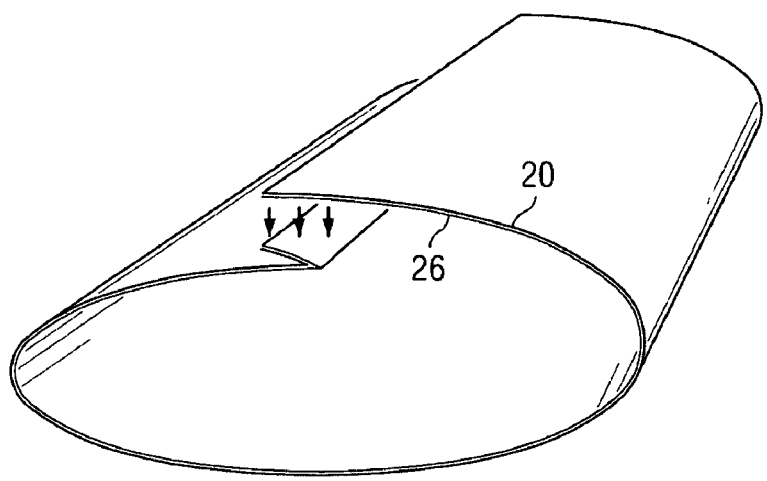
FIG. 2b is a schematic cross-section of a tube of packaging film illustrating the formation of a prior art fin seal.
Figure 4A:
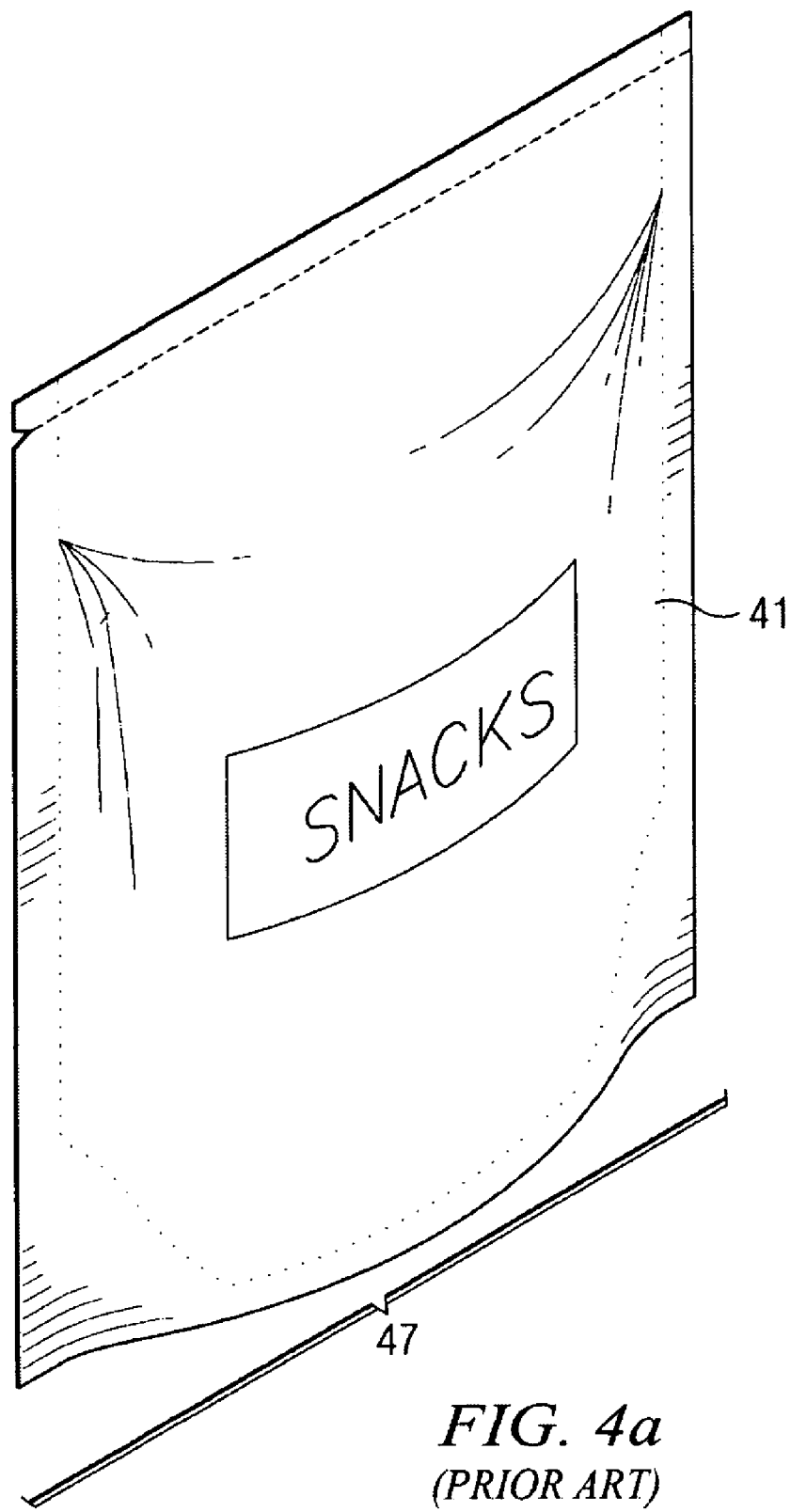
FIGS. 4a, 4b, and 4c are perspective views in elevation of a prior art horizontal stand-up pouch.
Figure 4B:
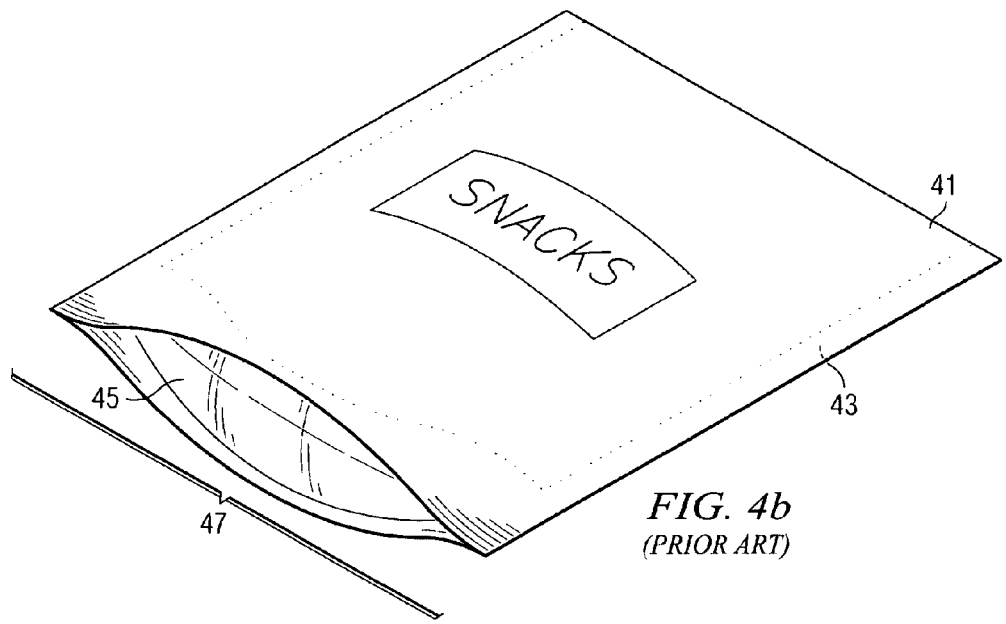
Figure 4C:
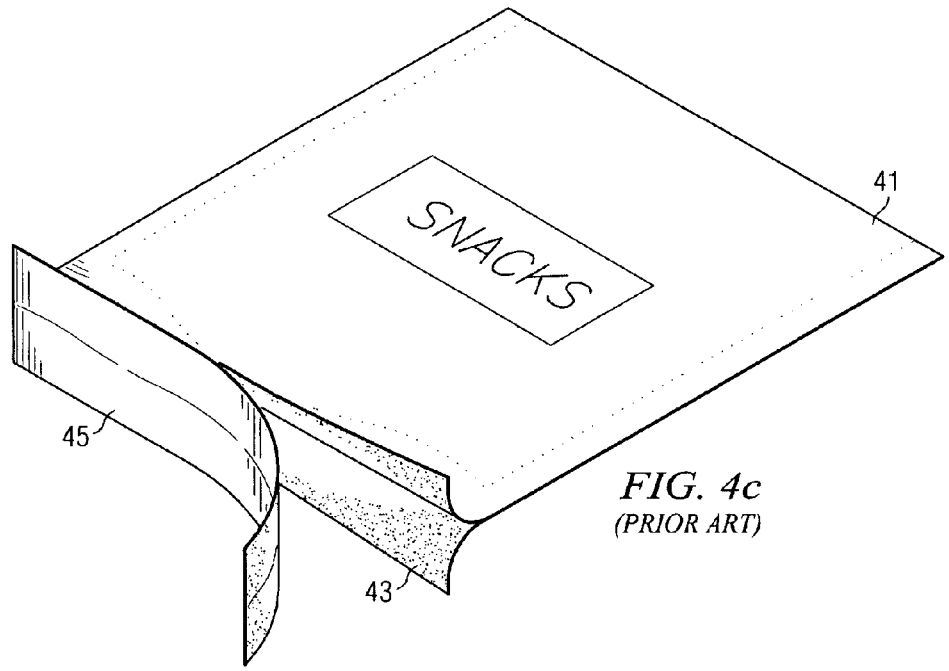

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A. Vertical Stand-Up Pouch

Figure 5A:
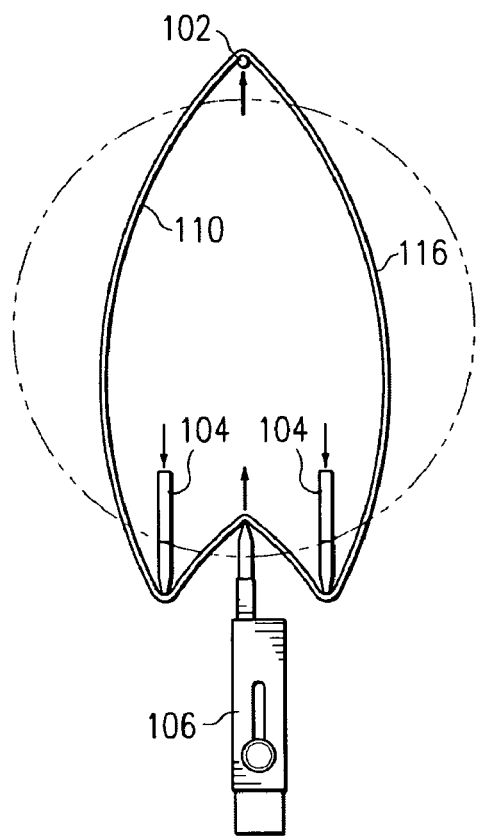
FIG. 5a is a schematic cross-section of a tube of packaging film formed by the vertical stand-up pouch embodiment of the present invention methods.
Figure 6A:
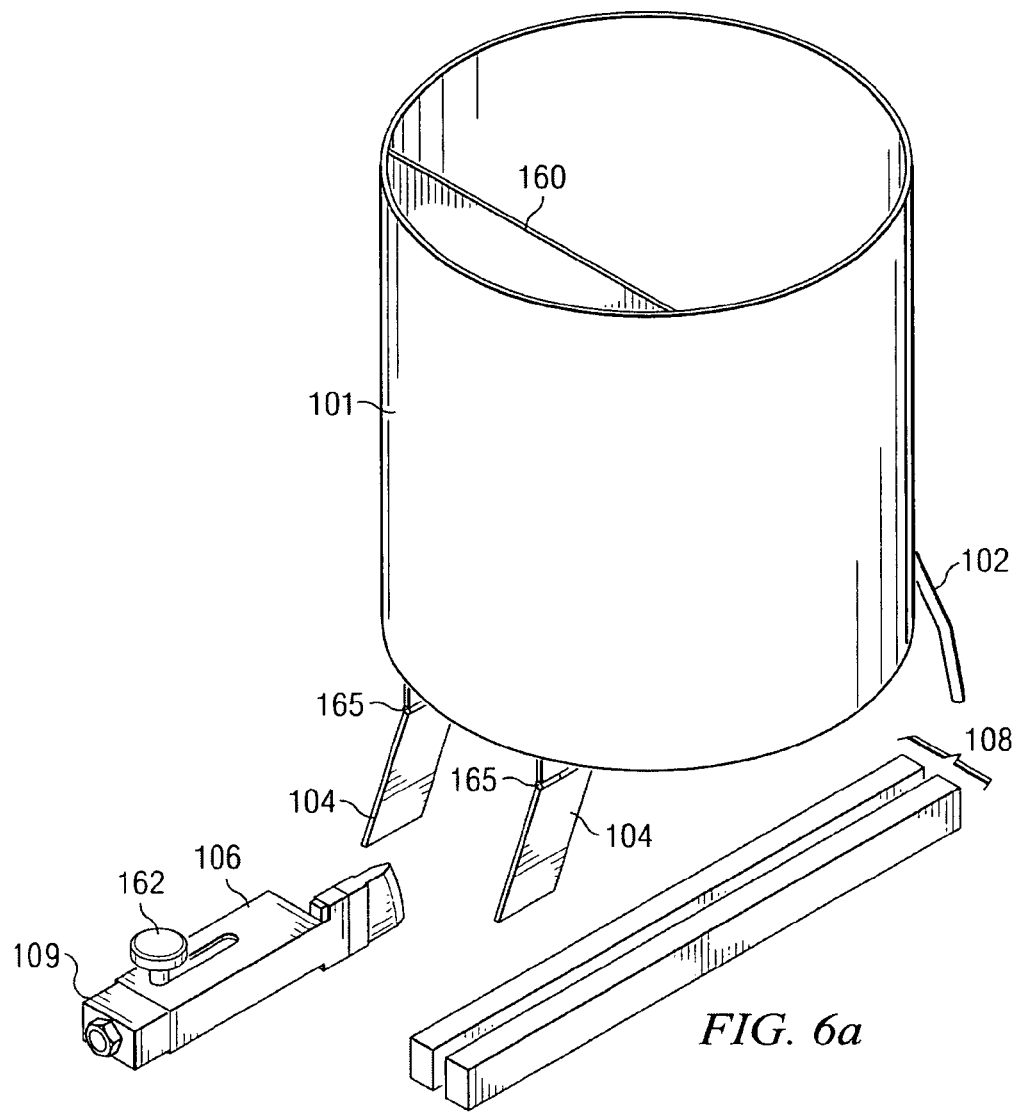
FIG. 6a is a perspective view of an embodiment of the stationary tucker mechanism, forming plates, and tension bar in elevation of the vertical stand-up pouch embodiment of the present invention in relation to a forming tube and sealing jaws of a vertical form, fill, and seal machine.

FIGS. 5a and 6a illustrate the basic components of the proposed invention as it relates to the manufacture of a vertical stand-up pouch. The same reference numbers are used to identify the same corresponding elements throughout all drawings unless otherwise noted. FIG. 5a is a schematic cross-section of a tube of packaging material (film) formed by the present invention method. The tube of packaging film shown in FIG. 5a is illustrated as a cross-sectional area immediately below the forming tube 101 of FIGS. 6a. The tube of packaging film comprises an outer layer 116 and an inner layer 110, and can comprise material typically used in the field of art for making a standard vertical flex bag, such as discussed in relation to FIG. 1. The tube in FIG. 5a has been formed by sealing one sheet of film with a vertical back seal, as previously described with regard to discussions of prior art vertical form and fill machine methods.

FIG. 6a shows a forming tube 101 typical in most respects to those used with prior art vertical form, fill, and seal machines. This forming tube 101 can be a cylinder, have a rectangular cross section, or any number of shapes, but is preferably cylindrical as illustrated. The film illustrated in FIG. 5a is initially formed around the forming tube 101 of FIG. 6a. This forming tube 101 is shown in elevation but would normally be integrally attached to the vertical form, fill, and seal machine. Also shown in FIG. 6a are a pair of prior art sealing jaws 108 likewise illustrated in elevation. Not shown in FIG. 6a is the sealing jaw carriage on which such sealing jaws 108 would be mounted below the forming tube 101.

As previously described, the practice in the prior art in the manufacture of a vertical flex bag involves feeding a continuous sheet of packaging film directed around the forming tube 101. A back seal is formed on a single layer of film in order to create a tube of film around the forming tube 101. The seal jaws 108 close on the thus formed tube of packaging film, thereby forming a bottom transverse seal. Product is then dropped through the forming tube 101 into the tube of packaging film. The tube is then driven downward by friction against rotating belts (not shown) and the seal jaws 108 are used to form another transverse seal above the level of the product found inside the tube. This seal is subsequently cut horizontally such that a top transverse seal is formed at the top of the filled bag below and a bottom transverse seal is formed on the tube of packaging film above.

The packaging film during the prior art operation described above is oriented to be readable by an operator of the machine as the film travels down the forming tube 101. This orientation provides graphics 39 on the formed prior art bag that are readable by a consumer when the formed bag is placed on a retail display shelf while resting on its bottom transverse seal 33 as seen in FIG. 3a. As will be described in further detail below, the orientation of the graphics on the film packaging for Applicants' invention is 90° off of the prior art orientation, such that the graphics appear sideways as viewed by the operator of the vertical form and fill machine as the film is pulled down the forming tube 101 of FIGS. 6a. In other words, the graphics on the packaging film are oriented perpendicular to the direction of film travel.

The embodiment of the present invention used to make vertical stand-up pouches adds the following basic components to a prior art vertical form, fill, and seal machine. A pair of forming plates 104 and one tension bar 102 are used to hold the packaging film tube in tension from inside the tube, as indicated by the arrows illustrated on FIG. 5a. As shown in FIG. 6a, the forming plates 104 and tension bar 102 can be attached directly to the forming tube 101 or, alternatively, to any supporting structure on the vertical form, fill, and seal machine, as long as the forming plates 104 and tension bar 102 are positioned within the tube of packaging material, below the bottom of the forming tube 101, and above the heat sealing jaws 108.

Tension is applied on the outside of the film and in the opposite direction of the tension provided by the forming plates 104 by a fixed or stationary tucker mechanism 106, alternatively referred to herein as a tucker bar 106, positioned between said forming plates 104. The tucker bar 106 can be attached to the frame of the vertical form, fill, and seal machine or any other point that can supports its function outside the film tube. For example, as shown in FIG. 6a, the tucker bar 106 is slideably coupled to a co-axial extension bar 109 which may be attached to a fixed attachment point (not shown) on the vertical form, fill, and seal machine). By loosening a tension screw 162, the position of the tucker bar 106 relative to the forming plates 104 can be adjusted by sliding the tucker bar 106 along the length of the extension bar 109. The tension screw 162 quickly locks the tucker bar 106 in place when tightened.

Figure 8:
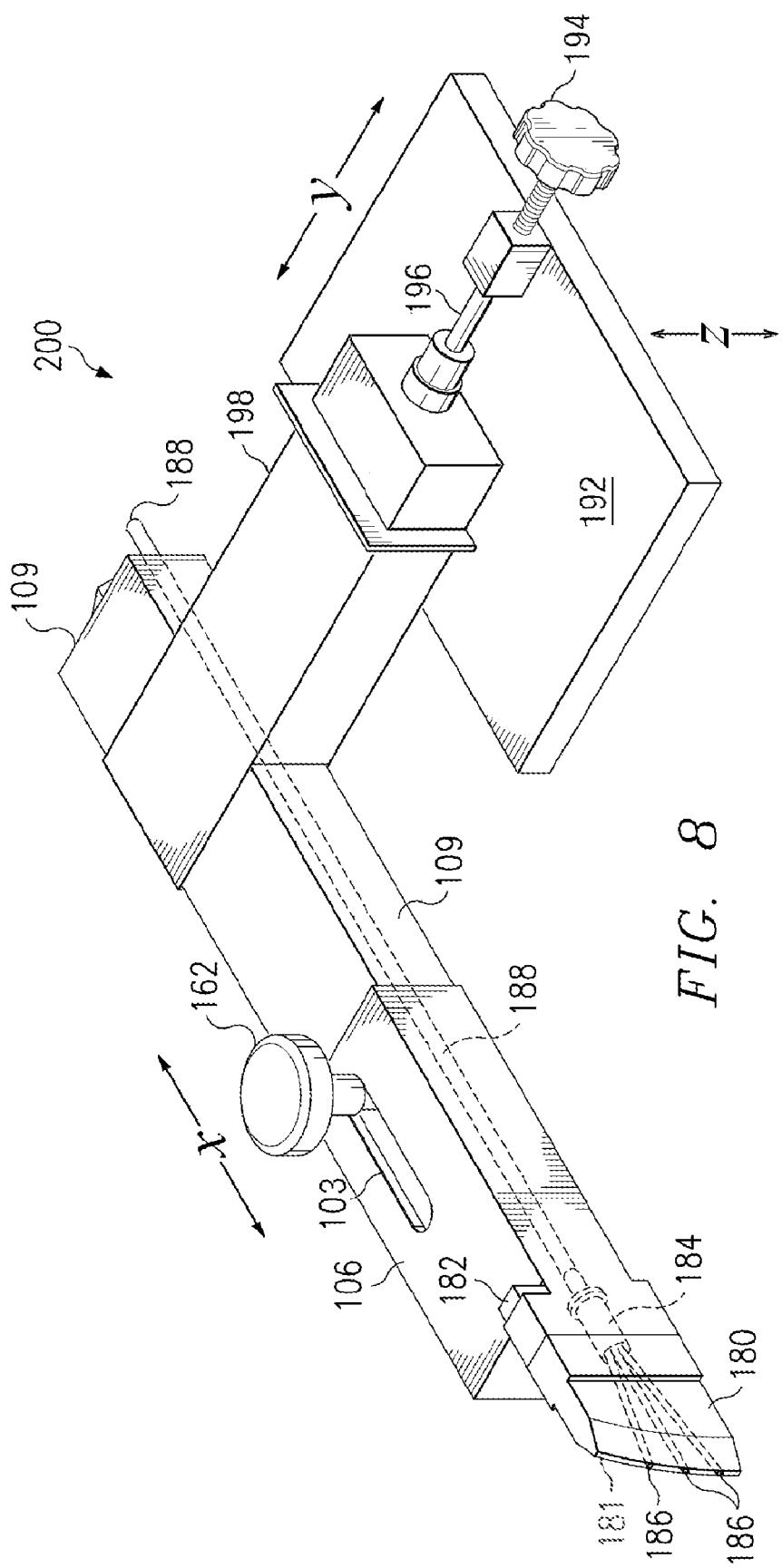
FIG. 8 is a perspective view of an embodiment of the stationary tucker mechanism of the present invention.

The tucker bar 106 is preferably attached to the sealing carriage for the vertical form, fill, and seal machine and is adjustable along multiple axes (e.g., in/out, up/down, and front/back). For example, FIG. 8 depicts such a preferred embodiment of the tucker bar 106. The tucker bar assembly 200 is affixed to the sealing carriage by means of a mounting plate 192. The position of the assembly 200 relative to the sealing carriage may be adjusted in the directions of arrow z by varying the size of spacer elements between the plate 192 and the carriage. The mounting plate 192 is connected to a bracket assembly 198 by means of a threaded rod 196. By turning knob 194, the position of bracket assembly 198, relative to the mounting plate 192, may be adjusted in the directions of arrow y, which is generally perpendicular to the directions of arrow z. Bracket assembly 198, in turn, is fixably attached to an extension bar 109 in a generally perpendicular orientation. The tucker bar 106 is slideably coupled to the co-axial extension bar 109. Thus, the position of the tucker bar 106, relative to extension bar 109, may be adjusted in the directions of arrow x, which is generally perpendicular to the directions of arrows y and z. A tension screw 162 is provided to lock the tucker bar 106 onto extension bar 109 when tightened.

The ability to adjust in multiple axes the position of the tucker bar 106, relative to the forming plates 104, allows for the tucker bar 106 to be easily moved out of the way to convert the vertical form and fill machine back to standard operation and is accomplished, in the embodiment shown in FIGS. 6a and 8, by a tension screw 162 that quickly locks the tucker bar 106 in place when tightened.

While the position of the tucker bar 106 relative to the forming plates 104 is adjustable, unlike in the prior art, it is fixed or stationary during operation. Therefore, the present invention is a substantial improvement over the prior art in that there are no moving parts to the tucker mechanism during bag making. Moreover, the fixed or stationary tucker bar gusseting mechanism 106 eliminates the need for reciprocating or moving parts that push against the film tube for the formation of a gusset. This elimination of moving parts allows for increased bag production rates, significantly lower changeover times to pillow pouch production, and significantly fewer maintenance issues. This improvement is what Applicants intend to describe when referring to the tucker bar 106 as "stationary" or "fixed." Because of this stationary tucker bar feature, bag making speeds can match typical pillow pouch manufacturing rates.

When moved forward into position (i.e., toward the forming plates 104), the stationary tucker bar 106 creates a V-shaped crease or fold in the tube of the packaging film between the two forming plates 104. This crease is formed prior to formation of the transverse seal by the seal jaws 108. Consequently, once the transverse seal is formed, the crease becomes an integral feature of one side of the package.

The vertical form, fill, and seal machine thereafter operates basically as previously described in the prior art, with the sealing jaws 108 forming a lower transverse seal, product being introduced through the forming tube 101 into the sealed tube of packaging film (which now has a crease on one side), and the upper transverse seal being formed, thereby completing the package.

The major differences between a prior art package and Applicants' package, however, are that a crease is formed on one side (which later becomes the bottom of the formed package) using the fixed mechanism described and that the graphics on the packaging film used by the invention are oriented such that when the formed package is stood onto the end with the crease, the graphics are readable by a consumer.

Figure 7A:
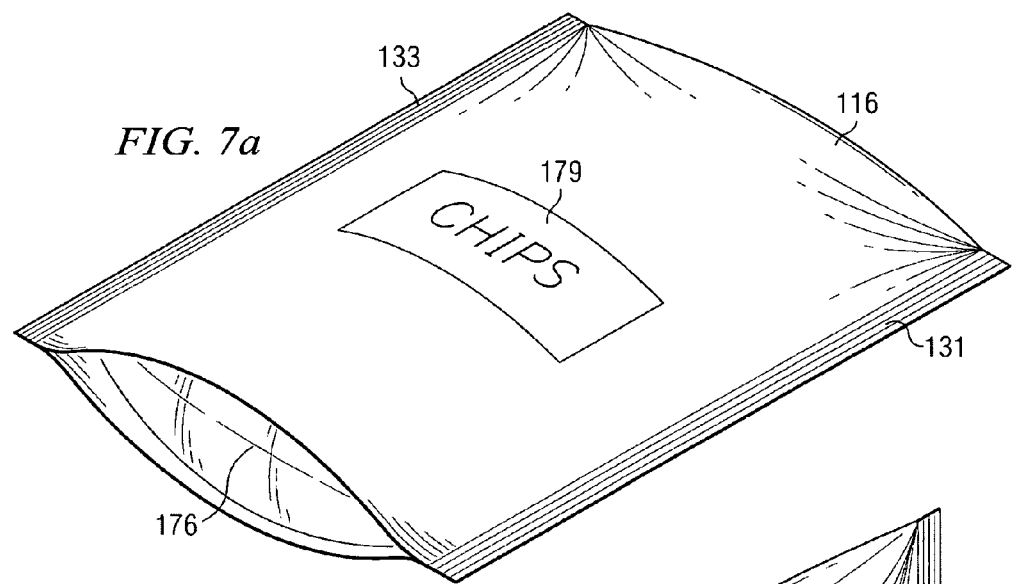
FIGS. 7a and 7b are perspective views of the vertical stand-up pouch of the present invention.
Figure 7B:
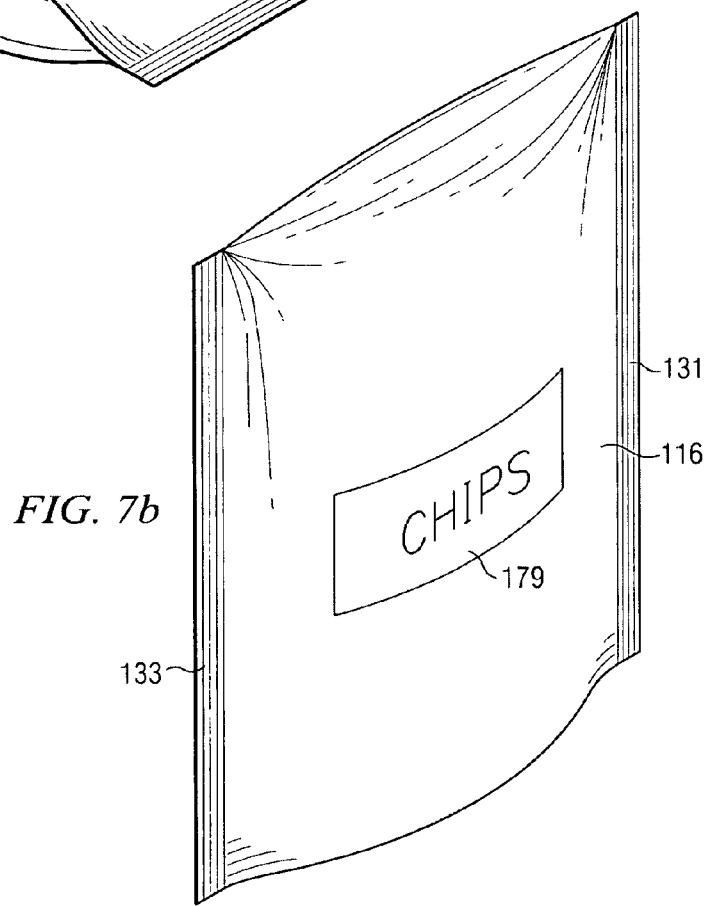

An example of the formed package of the instant invention is shown in FIGS. 7a and 7b, which show the outside layer of the packaging film 116 with the graphics 179 oriented as previously described. As can be seen from FIGS. 7a and 7b, the construction of the invention's vertical stand-up pouch shares characteristics with the prior art vertical flex bags shown in FIG. 3a. However, the transverse seals 131, 133 of the vertical stand-up bag of the invention are oriented vertically once the bag stands up on one end, as shown in FIG. 7b. FIG. 7a shows the crease 176 that is formed by the tucker bar 106 and forming plates 104 discussed in relation to FIGS. 5a and 6a.

Returning to FIGS. 6a, another optional feature that can be incorporated into this invention is the use of a diversion plate 160 within the forming tube 101. This diversion plate 160, in the embodiment illustrated, comprises a flat plate welded vertically inside the forming tube 101 that extends from the bottom of the forming tube 101 to some distance above (for example, at least two or three inches) the bottom of the forming tube 101, where it then is sealed against the inside of the forming tube 101.

The diversion plate 160 in a preferred embodiment accomplishes two functions. First, the diversion plate 160 keeps product that is dropped down the forming tube 101 away from the area where the crease is being formed on the tube of packaging film. Second, the diversion plate 160, if properly sealed against the forming tube 101, can be used as a channel for a gas or nitrogen flush. In such instance, the diversion plate 160 at some point above the bottom of the forming tube 101 seals at the top of the plate 160 against the forming tube 101. Below such seal (not shown) an orifice can be drilled into the forming tube 101 in order to provide gas communication between an exterior gas (for example, nitrogen or oxygen) source and the cavity formed between the diversion plate 160 and the interior of the forming tube 101. The diversion plate 160 as shown in FIG. 6a is a flat plate, but it should be understood that it can be of any variety of shapes, for example, having a curved surface, provided that it accomplishes the functionality of diverting the product away from the area where the tuck is formed on the tube of film.

By using the diversion plate 160 as a channel for the gas flush, the present invention eliminates the need for a separate gas tube to be placed inside the forming tube 101 that normally accomplishes the same function in the prior art. The added benefit of providing a relatively large volume channel formed by the diversion plate 160 and the interior of the forming tube 101 is that a relatively large volume of flushing gas can be introduced into a filled and partially formed package at a significantly lower gas velocity compared to prior art gas tubes. This allows for the filling of packages using this embodiment of the present invention that may contain low weight product that might otherwise be blown back into the forming tube by prior art flushing tubes.

FIG. 8 further illustrates a preferred embodiment of the stationary tucker bar 106 gusseting mechanism. This embodiment of the tucker bar 106 comprises a head 180 attached to a support 182. Drilled within the support 182 and head 180 is a gas channel 184 shown in phantom on FIG. 8. This gas channel 184, when connected to a tubular supply conduit 188, provides a gas communication from an exterior gas source (not shown) through the support 182, through the head 180, and out three orifices 186. The gas channel 184 allows for a metered burst of pressurized gas (typically air) that helps keep the tuck illustrated in FIG. 5a taut throughout the forming and sealing operation without the necessity of moving the tucker bar in and out during bag formation.

It should again be noted that during operation (i.e., bag making), the tucker bar 106 is always stationary. It should further be noted that the head 180 necessarily cannot extend along the entire length of the crease formed by the tucker bar 106 and forming plates 104. Further, it should be understood that when the sealing jaws 108 close onto the tube of film, the lateral dimensions of the tube of film change. All of these facts are compensated for by the use of the pressurized air bursting from the orifices 186. The pressurized air keeps an even amount of pressure on the tuck as it is being formed in the various stages of the forming and sealing process. The air burst can be continuous, but is preferably metered to start as the film for the next bag is being pulled down through the completion of the transverse seal.

The head 180 can comprise any non-stick material but is preferably a fluoropolymer, such as Teflon®. In an alternative embodiment, the stationary tucker bar 106 gusseting mechanism can comprise one integral piece of metal with the head portion 180 being coated with a fluoropolymer. The curved contact area 181 of the head 180 allows for the continuous formation of the tuck illustrated in FIG. 5a without tearing the packaging film as it is pushed down below the forming tube. While shown with three orifices 186, the head 180 can comprise any number of orifices from one on.

To further compensate for the change in the width of the film tube as the transverse seal is formed by the seal jaws 108 of FIG. 6a, it should be noted that the tension bar 102 bends outwardly away from the center of said tube of film along the length of the tension bar 102 and the forming plates 104 are hinged by a horizontal hinge 165. If the tension bar 102 is designed otherwise (e.g., strictly vertical) excess slack occurs in the area of the film tube near the transverse seal. The forming plates 104 comprise horizontal hinges 165 that allow the forming plates to fold inward (i.e., toward each other) slightly while the lower transverse seal is formed. Otherwise, the tube of packaging film would be ripped by the tips of the forming plates 104 during this step.

The present invention offers an economic method of producing a stand-up pouch with numerous advantages over prior art horizontal stand-up pouches and methods for making them.

Examples of these advantages are illustrated in Table 1 below.

TABLE 1

|  | Current Vertical Flex Bag | Commercially Available Horizontal Stand-Up Pouches | Applicants' Vertical Stand-Up Bag |
| --- | --- | --- | --- |
| Machine Type | Standard Vertical FFS | Pouch Form, Fill, Seal | Standard Vertical FFS |
| Machine Cost | $75,000.00 | $500,000.00 | $75,000.00 |
| Film Cost | $0.04/bag | $0.08/bag | $0.04/bag |
| Gas Flush | Less than 2% $O_2$ | Only to 5% $O_2$ | Less than 2% $O_2$ |
| Size Change | Easy, change former | 2 hours | Easy, change former |
| Format Change | Flex Bag Only | Stand-Up Pouch Only | Both, simple change |
| Continuous Feed Zipper Option | No | Yes | Yes |
| Bag Size Range in Inches | (Width/Height) 5/5 through 14/24 | (Width/Height) 5/5 through 10/12 | (Width/Height) 5/5 through 24/11 |

As noted above, a continuous feed zipper option is available on Applicants' invention, which is not available using current vertical form, fill, and seal machine technology. This is because of the orientation of the film graphics used on the packaging film of the present invention. Since the graphics are oriented 90° from the prior art, a zipper seal can be run continuously in a vertical line down the forming tube along with the packaging film as it is being formed into a tube and subsequent package. This is not possible with the prior art, because such orientation of a continuous vertical strip of a zipper seal would place such seal in a vertical orientation once the package is formed and stood up for display.

B. Flat Bottom Bag

Figure 5B:
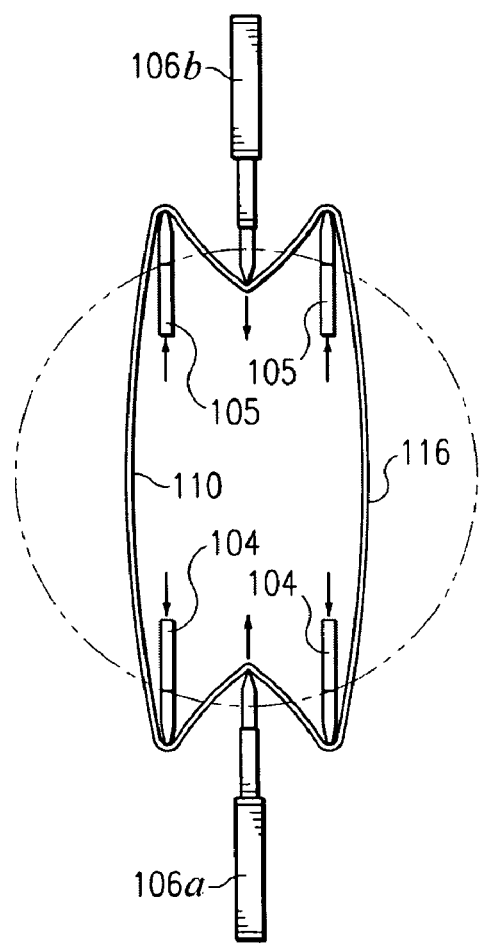
FIG. 5b is a schematic cross-section of a tube of packaging film formed by the flat bottom bag embodiment of the present invention methods.
Figure 6B:
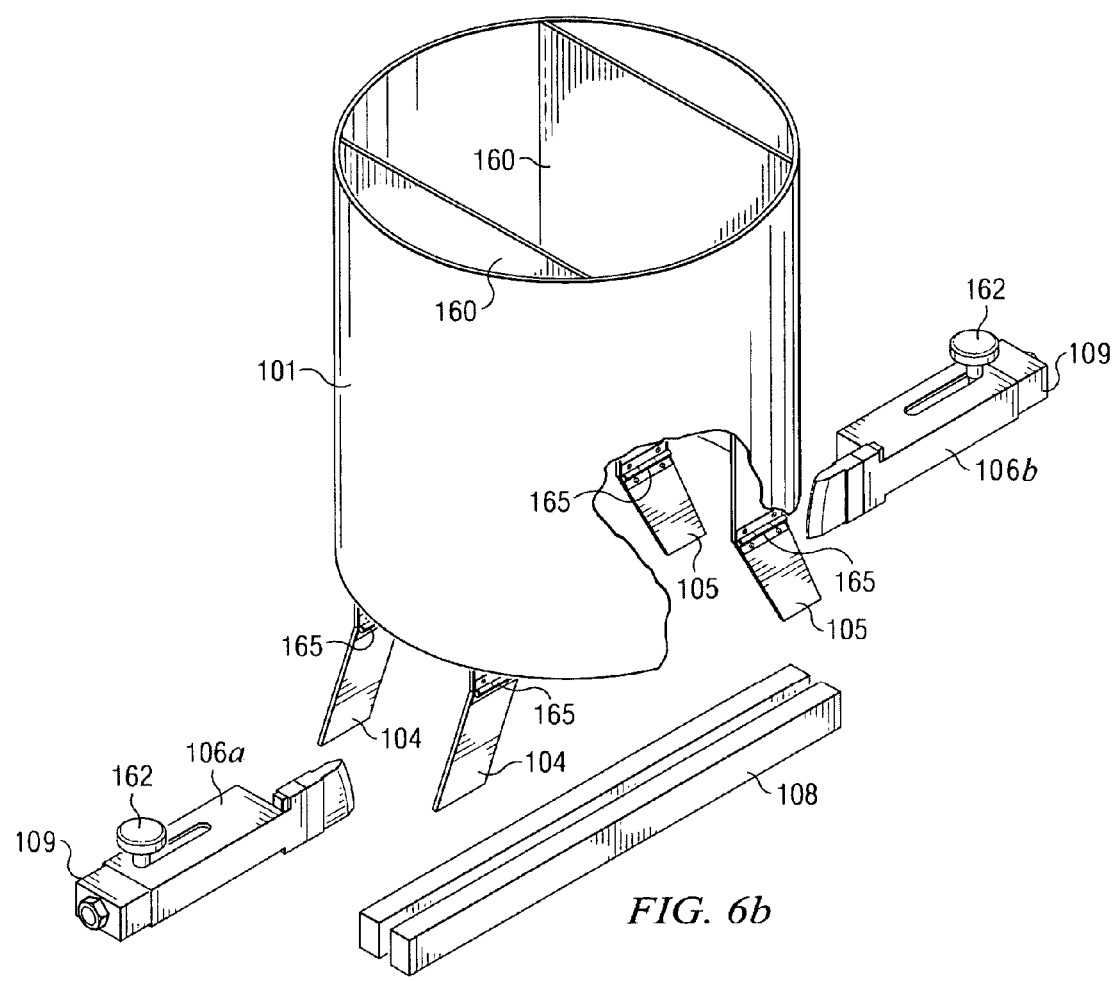
FIG. 6b is a perspective view of an embodiment of the stationary tucker mechanisms, forming plates, and tension bar in elevation of the flat bottom bag embodiment of the present invention in relation to a forming tube and sealing jaws of a vertical form, fill, and seal machine.

FIGS. 5b and 6b illustrate the basic components of the proposed invention as it relates to the manufacture of a flat bottom bag. FIG. 5b is a schematic cross-section of a tube of packaging material (film) formed by the present invention method. The tube of packaging film shown in FIG. 5b is illustrated as a cross-sectional area immediately below the forming tube 101 of FIG. 6b (shown in phantom in FIG. 5b). The tube of packaging film comprises an outer layer 116 and an inner layer 110, and can comprise material typically used in the field of art for making a standard vertical flex bag, such as discussed in relation to FIG. 1. However, for reasons that will become apparent from the discussion below, a first preferred embodiment of the bag of the present invention comprises an outside layer 116 that is not sealable on itself, such as paper. The tube in FIG. 5b has been formed by sealing one sheet of film with a vertical back seal, as previously described with regard to discussions of prior art vertical form and fill machine methods.

FIG. 6b shows a forming tube 101 typical in most respects to those used with prior art vertical form, fill, and seal machines. This forming tube 101 can be a cylinder, have a rectangular cross section, or any number of shapes, but is preferably cylindrical as illustrated. The film illustrated in FIG. 5b is initially formed around the forming tube 101 of FIG. 6b. This forming tube 101 is shown in elevation but would normally be integrally attached to the vertical form, fill, and seal machine. Also shown in FIG. 6b are a pair of prior art sealing jaws 108 likewise illustrated in elevation. Not shown in FIG. 6b is the sealing jaw carriage on which such sealing jaws 108 would be mounted below the forming tube 101.

As previously described, the practice in the prior art in the manufacture of a vertical flex bag involves feeding a continuous packaging film directed around the forming tube 101. A back seal is formed on a single layer of film in order to create a tube of film around the forming tube 101. The seal jaws 108 close on the thus formed tube of packaging film, thereby forming a bottom transverse seal. Product is then dropped through the forming tube 101 into the tube of packaging film. The tube is then driven downward by friction against rotating belts (not shown) and the seal jaws 108 are used to form another transverse seal above the level of the product found inside the tube. This seal is subsequently cut horizontally such that a top transverse seal is formed at the top of the filled bag below and a bottom transverse seal is formed on the tube of packaging film above.

The labeling on the packaging film in the prior art operation described above is in line with the longitudinal translation of the film so as to be readable by an operator of the machine as the film travels down the forming tube 101. This label orientation provides graphics 39 on the formed bag that are readable by a consumer when the formed bag is placed on a retail display shelf while resting on its bottom transverse seal 33 as seen in FIG. 3a. As will be described in further detail below, in accordance with one embodiment of the present invention, the orientation of the labeling graphics on the film packaging for Applicants' invention is shifted 90° from the typical prior art orientation, such that the labeling graphics appear sideways as viewed by the operator of the vertical form, fill, and seal machine as the film is pulled down the forming tube 101 of FIG. 6b. In other words, the labeling graphics on the packaging film are oriented perpendicular to the direction of film travel.

The embodiment of the present invention used to make flat-bottomed bags adds the following basic components to a prior art vertical form, fill, and seal machine. Two opposing pairs of stationary or fixed forming plates 104, 105 are used to hold the packaging film tube in tension from inside the tube, as indicated by the arrows illustrated on FIG. 5b. As shown in FIG. 6b, the forming plates 104, 105 can be attached directly to the forming tube 101 or, alternatively, to any supporting structure on the vertical form, fill, and seal machine, as long as the forming plates 104, 105 are positioned within the tube of packaging material, below the bottom of the forming tube 101, and above the heat sealing jaws 108.

Tension is applied on the outside of the film in the opposite direction of the tension provided by the forming plates 104, 105, by two stationary or fixed tucker mechanisms 106a, 106b, alternatively referred to herein as tucker bars 106a, 106b, positioned between said forming plates 104, 105.

The tucker bars 106a, 106b, can be attached to the frame of the vertical form, fill, and seal machine or any other point that can supports their function outside the film tube. For example, as shown in FIG. 6b, the tucker bars 106a, 106b, are each slideably coupled to its respective co-axial extension bar 109 which may be attached to a fixed attachment point (not shown) on the vertical form, fill, and seal machine). By loosening a tension screw 162, the position of each of the tucker bars 106a, 106b, relative to its respective forming plates 104, 105 can be adjusted by sliding the tucker bar 106 along the length of its respective extension bar 109. The tension screw 162 quickly locks each tucker bar 106 in place when tightened.

The tucker bars 106a, 106b are preferably attached to the sealing carriage for the vertical form, fill, and seal machine and are adjustable along multiple axes (in/out, up/down, and front/back). For example, as mentioned previously, FIG. 8 depicts such a preferred embodiment of the tucker bar 106. Each tucker bar assembly 200 is affixed to the sealing carriage by means of a mounting plate 192. The position of the each assembly 200 relative to the sealing carriage may be adjusted in the directions of arrow z by varying the size of spacer elements between each plate 192 and the carriage. Each mounting plate 192 is connected to a respective bracket assembly 198 by means of a threaded rod 196. By turning knob 194, the position of each bracket assembly 198, relative to its mounting plate 192, may be adjusted in the directions of arrow y, which is generally perpendicular to the directions of arrow z. Each bracket assembly 198, in turn, is fixably attached to an extension bar 109 in a generally perpendicular orientation. Each tucker bar 106 is slideably coupled to its respective co-axial extension bar 109. Thus, the position of each tucker bar 106, relative to its respective extension bar 109, may be adjusted in the directions of arrow x, which is generally perpendicular to the directions of arrows y and z. A tension screw 162 is provided to lock the tucker bar 106 onto extension bar 109 when tightened.

The ability to adjust in multiple axes the position of each of the tucker bars 106a, 106b, relative to its respective forming plates 104, 105, allows for the tucker bars 106a, 106b to be easily moved out of the way to convert the vertical form and fill machine back to standard operation and is accomplished, in the embodiment shown in FIG. 6b and 8, by tension screws 162 that can quickly lock their respective tucker bars 106a, 106b in place when tightened.

While the position of each tucker bar 106a, 106b relative to its respective forming plates 104, 105 is adjustable, unlike in the prior art they are fixed or stationary during operation. Therefore, the fixed or stationary gusseting mechanisms 106a, 106b in the present invention are a substantial improvement over the prior art in that there are no moving parts to the tucker or gusseting mechanisms during bag making. Moreover, the fixed or stationary tucker bar gusseting mechanisms 106a, 106b eliminate the need for reciprocating or moving parts that push against the film tube for the formation of a gusset. This elimination of moving parts allows for increased bag production rates, significantly lower changeover times to pillow pouch production, and significantly fewer maintenance issues. This improvement is what Applicants intend to describe when referring to the tucker bars 106a, 106b as "stationary" or "fixed." Because of this stationary tucker bar feature, bag making speeds can match typical pillow pouch manufacturing rates, modification costs are low (such as 3 to 4 thousand dollars per machine), and no additional maintenance issues are introduced.

When moved forward into position (i.e., toward the forming plates 104, 105), the stationary tucker bar gusseting mechanisms 106a, 106b each create a crease or fold in the tube of the packaging film between the two pairs of forming plates 104, 105. These creases are formed prior to formation of the transverse seal by the seal jaws 108. Consequently, once the transverse seal is formed, the creases become integral features of two sides of the package, referred to as gussets. As shown in FIG. 3b, these gussets 37 form a "V" shape on each end of the horizontal transverse seals 31, 33 when the outer layer of packaging film used to form the bag comprises a material that does not seal on itself, such as paper.

After the transverse seals are formed, the vertical form, fill, and seal machine thereafter operates basically as previously described in the prior art, with the sealing jaws 108 forming a lower transverse seal, product being introduced through the forming tube 101 into the sealed tube of packaging film (which now has a vertical crease on two opposing sides), and the upper transverse seal being formed, thereby completing the package.

An example of a first preferred embodiment of the formed flat-bottomed bag of the instant invention is shown in FIG. 3b, which shows the outside layer of the packaging film 30 with the graphics 38 conventionally oriented as previously described. As mentioned previously, in this embodiment the outside layer of packaging film 30 is comprised of a material that is not sealable on itself, such as paper. As can be seen from FIG. 3b, the construction this embodiment of the invention's flat bottom bag shares many of the characteristics with the prior art flat-bottomed bags. FIG. 3b shows the gussets 37 that are formed by the previously discussed stationary tucker bar gusseting mechanisms 106a, 106b. The major difference between prior art packages and the first preferred embodiment of the formed flat-bottomed bag of the instant invention, however, is that the gussets are formed on each side of the package of the present invention using the stationary tucker bar gusseting mechanisms 106a, 106b previously described. A variant of the first preferred embodiment of the formed flat-bottomed bag of the instant invention features an outside layer 130 of the film comprised of a material that seals on itself, thereby closing the ends of the "V" shaped gussets 137 as illustrated in FIG. 7c.

Figure 7C:
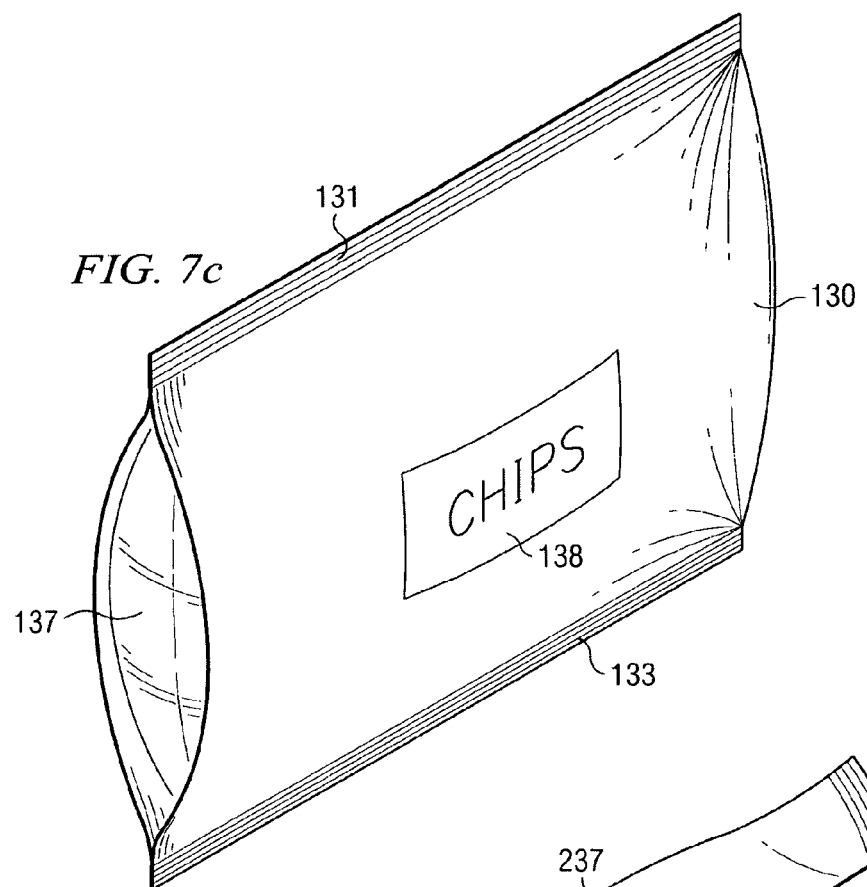
FIG. 7c is a perspective view of an embodiment of the flat-bottom bag of the present invention, constructed of material that seals upon itself.

In accordance with a method for producing the first preferred embodiment of the flat-bottomed bag of the present invention shown in FIGS. 3b and 7c, the labeling of the packaging film is oriented in line with the longitudinal translation of the film so as to be readable by an operator of the machine as the film travels down the forming tube 101 (as in the prior art operation described above). This label orientation provides labeling graphics 38, 138 on the formed bags that are readable by a consumer when the formed bags are placed on a retail display shelf while resting on its bottom transverse seal 33, 133 as shown in FIGS. 3b and 7c.

In contrast to the to the foregoing method (wherein the labeling graphics of the flat-bottomed bag are oriented in a conventional manner), in an alternative embodiment the orientation of the labeling graphics on the packaging film for the invention is shifted 90° so that the labeling graphics appear sideways as viewed by the operator of the vertical form, fill and seal machine when the film is advanced down the forming tube 101 of FIG. 6b. In other words, the labeling graphics on the packaging film are oriented perpendicular to the direction of film travel such that when the formed package is stood onto the end with the crease, the graphics are readable by a consumer.

Figure 7D:
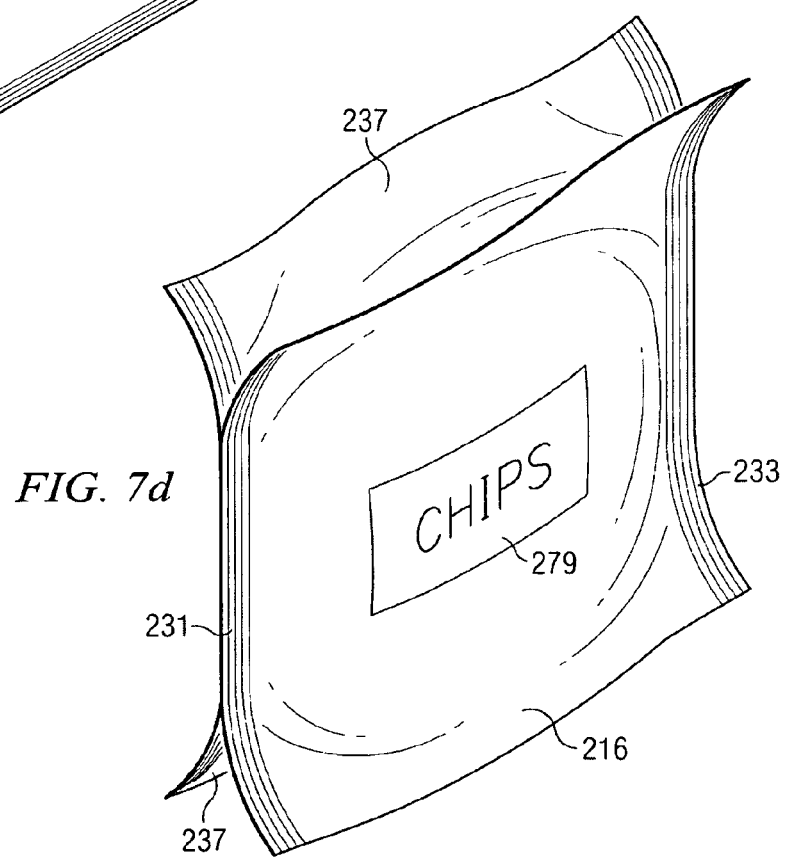
FIG. 7d is a perspective view of an alternative embodiment of the flat-bottom bag of the present invention, constructed of material that does not seal upon itself.

As shown in FIG. 7d, the resulting package comprises an outside layer of the packaging film 216 with the graphics 279 oriented as previously described. As illustrated in FIG. 7d, the alternative embodiment includes an outside layer of packaging film 216 which is comprised of a material that is not sealable on itself, such as paper. As can be seen from FIG. 7d, the construction this alternative embodiment of the invention's flat bottom bag shares many of the characteristics with the prior art flat-bottomed bags. FIG. 7d shows the gussets 237 that are formed by the previously described stationary tucker bar gusseting mechanisms 106a, 106b and forming plates 104, 105 discussed in relation to FIGS. 5b and 6b. However, in this alternative embodiment, the transverse seals 231, 233 of the flat bottom bag of the invention are oriented vertically when the bag is properly stood up on one end, as shown in FIG. 7d.

Figure 7E:
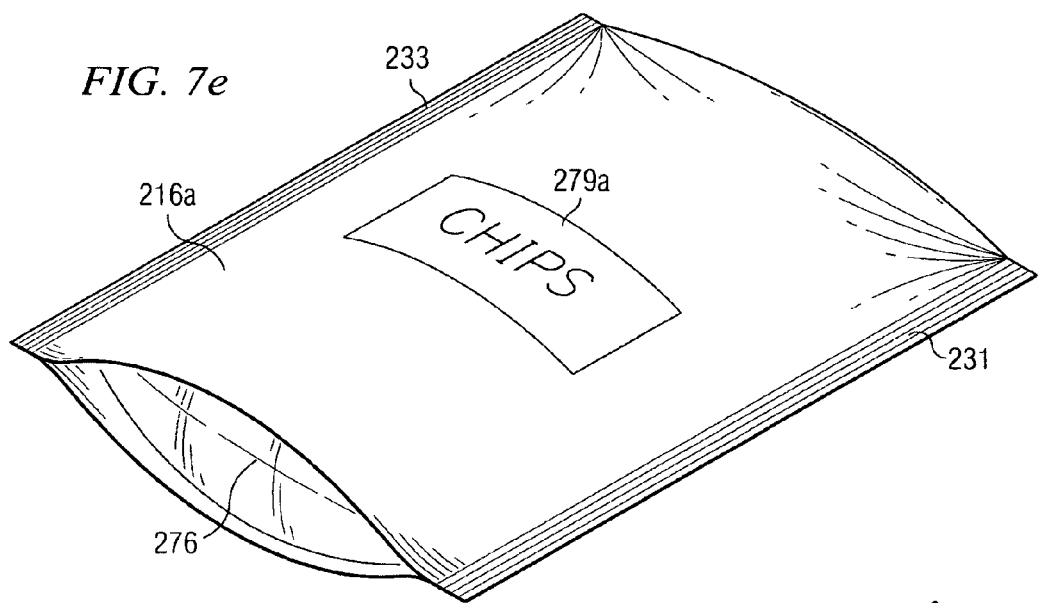
FIGS. 7e and 7f are perspective views of an alternative embodiment of the flat-bottom bag of the present invention, constructed of material that seals upon itself.
Figure 7F:
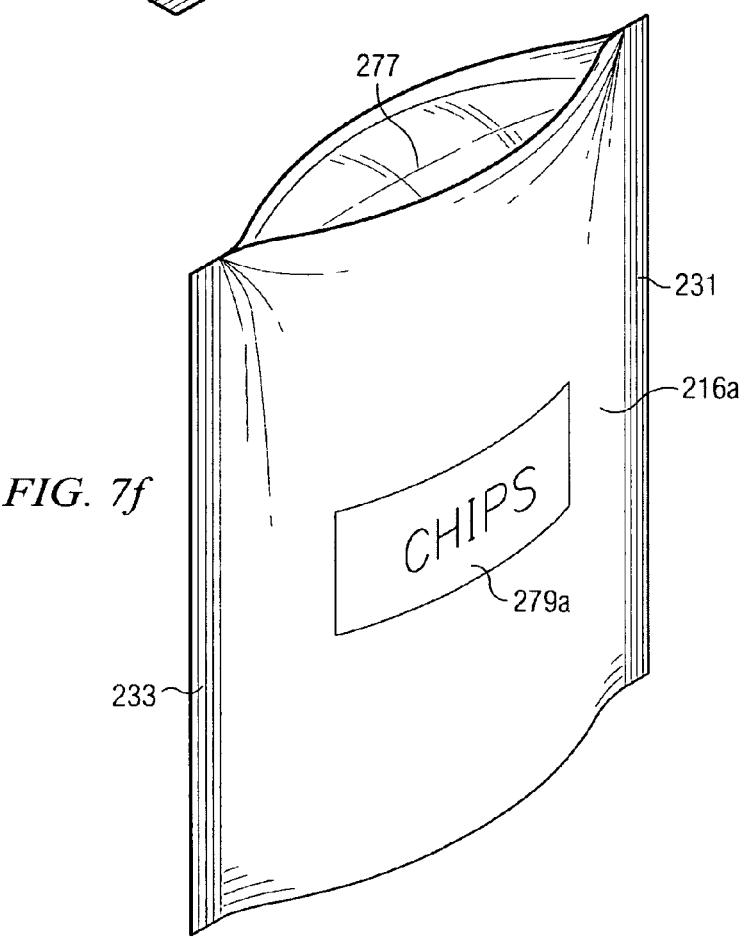

As shown in FIGS. 7e and 7f, a preferred variant of the alternative embodiment of the formed flat-bottomed bag features an outside layer 216a of the packaging film comprised of a material that seals on itself, thereby closing the ends of the "V" shaped gussets 276, 277. The preferred variant of the alternative embodiment of the flat-bottom bag of the instant invention comprises an outside layer of the packaging film 216a with the graphics 279a oriented as previously described. As can be seen from FIGS. 7e and 7f, the construction of this alternative embodiment of the flat-bottom bag shares characteristics with the prior art vertical flex bags shown in FIG. 3a. However, the transverse seals 231, 233 of the flat bottom bag of the invention are oriented vertically once the bag is stood up on one end, as shown in FIG. 7f. FIGS. 7e and 7f also show the creases 276, 277 formed by the previously described stationary tucker bar gusseting mechanisms 106a, 106b between each of the two pairs of forming plates 104, 105 as discussed in relation to FIGS. 5b and 6b.

Returning to FIG. 6b, another optional feature that can be incorporated into this invention is the use of one or two diversion plates 160 within the forming tube 101. These diversion plates 160, in the embodiment illustrated, comprise a flat plate welded vertically inside the forming tube 101 that extends from the bottom of the forming tube 101 to some distance above (for example, at least two or three inches) the bottom of the forming tube 101, where it then is sealed against the inside of the forming tube 101.

The diversion plates 160 in a preferred embodiment accomplish two functions. First, the diversion plates 160 keep product that is dropped down the forming tube 101 away from the area where the crease is being formed on the tube of packaging film. Second, the diversion plates 160, if properly sealed against the forming tube 101, can be used as channels for a gas or nitrogen flush. In such instance, at least one, but preferably both diversion plates 160 at some point above the bottom of the forming tube 101 seal at the top of the plate 160 against the forming tube 101. Below such seal (not shown) one or more orifices can be drilled into the forming tube 101 in order to provide gas communication between an exterior gas (for example, nitrogen or oxygen) source and the cavity formed between a diversion plate 160 and the interior of the forming tube 101. The diversion plates 160 are shown in FIG. 6b as a flat plate, but it should be understood that they could be of any variety of shapes, for example, having a curved surface, provided that they accomplish the functionality of diverting the product away from the area where the tucks are formed on the tube of film.

By using one or more of the diversion plates 160 as a channel for the gas flush, the present invention eliminates the need for a separate gas tube to be placed inside the forming tube 101 that normally accomplishes the same function in the prior art. The added benefit of providing a relatively large volume channel formed by a diversion plate 160 and the interior of the forming tube 101 is that a relatively large volume of flushing gas can be introduced into a filled and partially formed package at a significantly lower gas velocity compared to prior art gas tubes. This allows for the filling of packages using this embodiment of the present invention that may contain low weight product that might otherwise be blown back into the forming tube by prior art flushing tubes.

FIG. 8 further illustrates a preferred embodiment of a stationary tucker bar gusseting mechanism 106. This embodiment of the stationary tucker bar 106 comprises a head 180 attached to a support 182. Drilled within the support 182 and head 180 is a gas channel 184 shown in phantom on FIG. 8. This gas channel 184, when connected to a tubular supply conduit 188, provides a gas communication from an exterior gas source (not shown) through the support 182, the head 180, and out three orifices 186. The gas channel 184 allows for a metered burst of pressurized gas (typically air) that helps keep the tucks illustrated in FIG. 5b taut throughout the forming and sealing operation without the necessity of moving the tucker bars 106a, 106b in and out during bag formation.

It should again be noted that during operation (i.e., bag making) the tucker bars 106a, 106b are always stationary. It should further be noted that the head 180 necessarily cannot extend along the entire length of the crease formed by the tucker bar 106 and forming plates 104. Further, it should be understood that when the sealing jaws 108 close onto the tube of film, the lateral dimensions of the tube of film changes. All of these facts are compensated for by the use of the pressurized air bursting from the orifices 186. The pressurized air keeps an even amount of pressure on the tuck as it is being formed in the various stages of the forming and sealing process. The air burst can be continuous, but is preferably metered to start as the film for the next bag is being pulled down through the completion of the transverse seal.

The heads 180 can comprise any non-stick material but is preferably a fluoropolymer, such as Teflon®. In an alternative embodiment, the tucker bars 106a, 106b can each comprise an integral piece of metal with the head portion 180 being coated with a fluoropolymer. The curved contact area 181 of the head 180 allows for the continuous formation of the tucks illustrated in FIG. 5b without tearing the packaging film as it is pushed down below the forming tube. While shown with three orifices 186, the head 180 can comprise any number of orifices from one on.

To further compensate for the change in the width of the film tube as the transverse seal is formed by the seal jaws 108 of FIG. 6b, it should be noted that each of the forming plates 104, 105 are hinged by a horizontal hinge 165. The forming plates 104, 105 comprise horizontal hinges 165 that allow the forming plates to fold inward (i.e., toward each other) slightly while the lower transverse seal is formed. Otherwise, the tube of packaging film would be ripped by the tips of the forming plates 104, 105 during this step.

The present invention offers an economic method of producing a flat bottom bag with numerous advantages over prior art horizontal stand-up pouches and methods for making them.

Examples of these advantages are illustrated in Table 2 below.

TABLE 2

|  | Current Vertical Flex Bag | Commercially Available Horizontal Stand-Up Pouches | Applicants' Flat Bottom Bag |
|---|---|---|---|
| Machine Type | Standard Vertical FFS | Pouch Form, Fill, Seal | Standard Vertical FFS |
| Machine Cost | $75,000.00 | $500,000.00 | $75,000.00 |
| Film Cost | $0.04/bag | $0.08/bag | $0.04/bag |
| Gas Flush | Less than 2% $O_2$ | Only to 5% $O_2$ | Less than 2% $O_2$ |
| Size Change | Easy, change former | 2 hours | Easy, change former |
| Format Change | Flex Bag Only | Stand-Up Pouch Only | Both, simple change |
| Bag Size Range in Inches | (Width/Height) 5/5 through 14/24 | (Width/Height) 5/5 through 10/12 | (Width/Height) 5/5 through 11/24 |

Further, the speed at which a form, fill, and seal machine modified by Applicants' invention can run is not compromised by the modification, as is the case with the prior art method for making a flat bottom bag using a triangular-shaped device that is moved in and out during operation. In fact, Applicants' invention allows bag production rates on the order of twice as fast as the prior art method for making the same style bag.

In addition, the lack of moving parts associated with the tucker mechanisms of Applicants' invention greatly reduce the cost of converting a vertical form, fill, and seal machine to manufacturing flat bottom bags, as well as reduces maintenance issues involved thereby. For example, converting a vertical form, fill, and seal machine to a flat bottom bag configuration using prior art devices that move in and out during operation costs in the range of $30,000.00 per machine. Applicants' invention involves retrofitting existing vertical form, fill, and seal machines at a fraction, approximately 1/10 th, of that cost.

While the invention has been particularly shown and described with reference to a preferred embodiment, it will be understood by those skilled in the art that various changes in form and detail may be made therein without departing from the spirit and scope of the invention.

The invention claimed is:

1. A gusseting mechanism for imparting a longitudinal crease in a film tube formed around a vertical forming tube of a vertical form, fill, and seal machine, comprising:
   a stationary tucker bar located outside said film tube having a means for blowing pressurized gas against said film tube, said means for blowing pressurized gas comprising at least one gas port in said tucker bar that is in communication with a pressurized gas source,
   a pair of forming plates located inside the film tube and positioned below and projecting away from said forming tube,
   a mounting mechanism for positioning said tucker bar so that said gas is blown against the exterior of said film tube at a point between said pair of forming plates to form said crease in said film tube.

2. The gusseting mechanism of claim 1 wherein said tucker bar includes a head portion comprised of a fluoropolymer.

3. The gusseting mechanism of claim 2 wherein said head portion comprises a curved contact area.

4. The gusseting mechanism of claim 1 further said mounting mechanism comprising means for removably mounting said tucker bar to allow conversion of said machine to an operation without the use of said gusseting mechanism.

5. The gusseting mechanism of claim 4 wherein said means for removably mounting said tucker bar comprises an extension bar attachable to a fixed attachment point on said machine, said extension bar co-axially aligned with and selectively coupled to said tucker bar.

6. The gusseting mechanism of claim 4 wherein said means for removably mounting said tucker bar may be adjusted along at least one axis of orientation relative to said forming plates.

7. The gusseting mechanism of claim 4 wherein said means for removably mounting said tucker bar may be adjusted along more than one axis of orientation relative to said forming plates.

8. The gusseting mechanism of claim 1 wherein said gas is blown continually at a constant pressure against the exterior of said film tube.

9. The gusseting mechanism of claim 1 wherein said gas is blown in metered bursts of pressure against the exterior of said film tube.

10. A system for imparting a longitudinal crease in a film tube formed around a forming tube of a vertical form, fill, and seal machine, comprising:
    a stationary tucker bar having a means for blowing pressurized gas against said film tube,
    a pressurized gas source; and
    a pair of forming plates projecting away from said forming tube;
    wherein said means for blowing pressurized gas comprises at least one gas port in said tucker bar that is in communication with said pressurized gas source, and is operable to blow gas against the exterior of said film tube at a point between said forming plates.

11. The system of claim 10 wherein said tucker bar includes a head portion comprised of a fluoropolymer.

12. The system of claim 11 wherein said head portion comprises a curved contact area.

13. The system of claim 10 further comprising means for removably mounting said tucker bar to allow conversion of said machine to an operation without the use of said gusseting mechanism.

14. The system of claim 13 wherein said means for removably mounting said tucker bar comprises an extension bar attachable to a fixed attachment point on said machine, said extension bar co-axially aligned with and selectively coupled to said tucker bar.

15. The system of claim 13 wherein said means for removably mounting said tucker bar may be adjusted along at least one axis of orientation relative to said forming plates.

16. The system of claim 13 wherein said means for removably mounting said tucker bar may be adjusted along more than one axis of orientation relative to said forming plates.

17. The system of claim 10 wherein said gas is blown continually at a constant pressure against the exterior of said film tube.

18. The system of claim 10 wherein said gas is blown in metered bursts of pressure against the exterior of said film tube.

19. The system of claim 10 further comprising at least one tension bar attached to and extending below said forming tube at a location approximately opposite from said forming plates.

20. The system of claim 10 further comprising a diversion plate attached to inside of said forming tube, said diversion plate positioned vertically above said pair of forming plates.

21. The system of claim 10 wherein each of said pair of forming plates further comprise a horizontal hinge between the forming plate and said forming tube.

* * * * *